May 28, 1935.  J. B. DEUTSCH  2,003,253
PIE CUTTER
Filed Aug. 25, 1931   2 Sheets-Sheet 1

Inventor
Joseph B. Deutsch

By Clarence A. O'Brien
Attorney

May 28, 1935.  J. B. DEUTSCH  2,003,253
PIE CUTTER
Filed Aug. 25, 1931  2 Sheets-Sheet 2
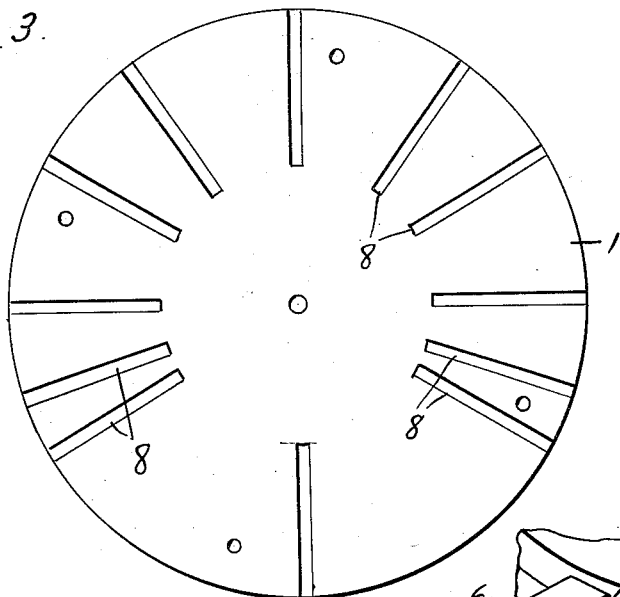
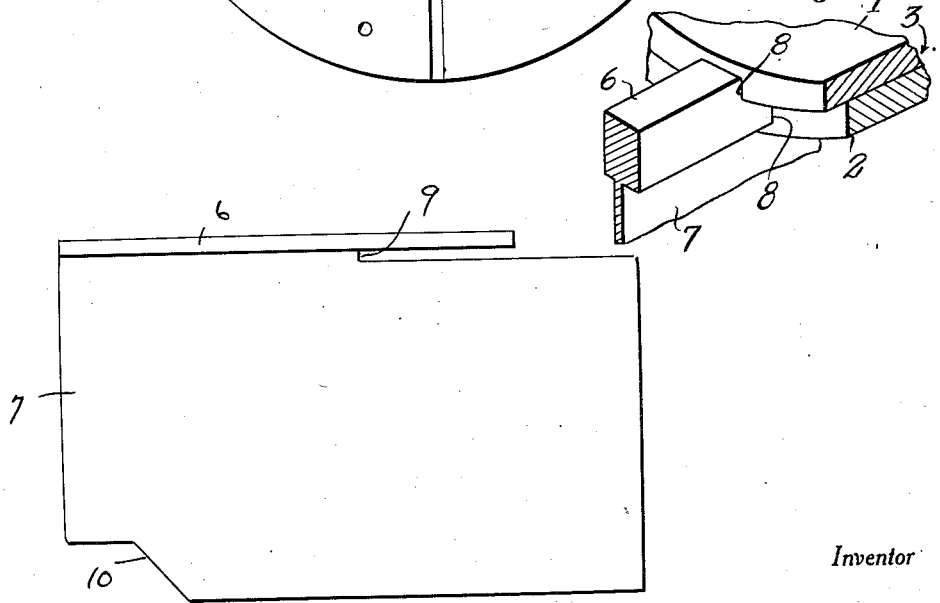
Inventor
Joseph B. Deutsch
By Clarence A. O'Brien
Attorney Patented May 28, 1935

2,003,253

UNITED STATES PATENT OFFICE 2,003,253

PIE CUTTER

Joseph B. Deutsch, Boulder City, Nev.

Application August 25, 1931, Serial No. 559,335

3 Claims. (Cl. 146—209)

The present invention relates to a pie cutter and has for its primary object to provide, in a manner as hereinafter set forth, a device of this character embodying a novel construction, combination and arrangement of parts through the medium of which a pie may be expeditiously cut into any desired number of equal parts.

Other objects of the invention are to provide a pie cutter of the character described which will be simple in construction, strong, durable, highly efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a view in bottom plan of the upper portion of the blade holder.

Figure 4 is a detail view in side elevation of one of the removable blades.

Figure 5 is an enlarged fragmentary view showing the relative arrangement of the upper and lower disks of the blade holder and one of the blades and its supporting bar.

Figures 1, 2:
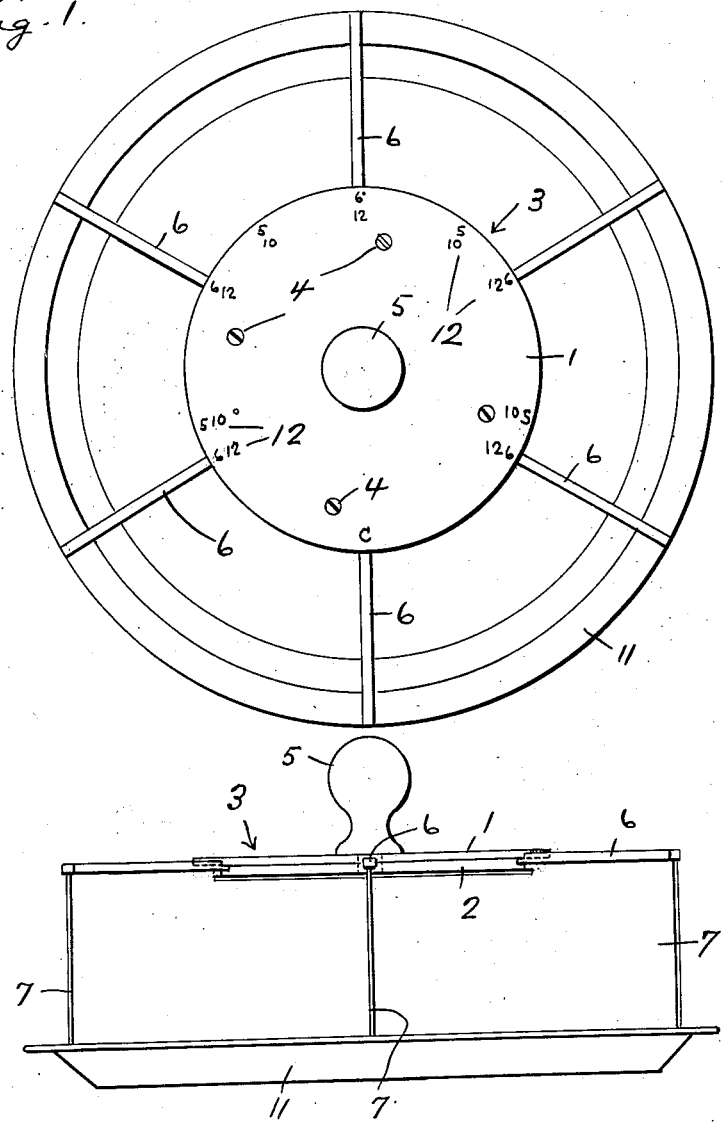
Figure 1 is a view in top plan of a pie cutter in accordance with the present invention, showing the same disposed in a conventional pie plate.
Figure 2 is a view in side elevation thereof.

Referring now to the drawings in detail, it will be seen that the pie cutter constituting the present invention comprises a blade holder including an upper disk 1 and a lower disk 2, said lower disk being of less diameter than the upper disk. The blade holder is designated generally by the reference numeral 3. The upper and lower disks 1 and 2 constituting the blade holder are secured together by any suitable means, as by the screws 4. The disks 1 and 2 are provided with a centrally disposed, threaded opening for the reception of a reduced, threaded shank on the lower end of a knob or handle 5.

The abutting faces of the upper and lower disks 1 and 2 of the holder 3 are provided with opposed, radially disposed channels which, in conjunction with each other provide a series of radially disposed sockets for slidably receiving the free inner end portions of the supporting bars 6 of the blades 7. The grooves provided in the disks 1 and 2 are designated by the reference numeral 8 and an arrangement thereof is illustrated to advantage in Figure 3 of the drawings. The upper, outer portions of the blades 7 are provided with extensions 9 upon which the bars 6 are fixed in any suitable manner, said bars extending inwardly beyond the extensions and terminating, at their inner ends, in spaced relation to the inner ends of the blades, as clearly seen in Figure 4 of the drawings. In this manner, the inner portions of the bars 6 are disposed in spaced parallelism with the adjacent upper edge portions of the blades.

The lower outer portions of the blades 7 are recessed, as at 10, in order that the blades will conform substantially to a conventional pie plate 11. Suitable indicating numerals 12 are provided on the upper face of the upper disk 1 of the blade holder 3 to facilitate inserting the bars 6 of the blades 7 in the desired sockets in the holder.

It is believed that the many advantages of a pie cutter constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A pie cutter comprising a substantially circular holder having a series of radially disposed sockets therein communicating with its periphery for selectively receiving a plurality of blades, and a plurality of blades removably mounted on the holder, said blades including extensions on their upper portions, and bars fixed on the extensions and extending inwardly therefrom for slidable endwise insertion in the sockets.

2. A pie cutter comprising a substantially circular holder having a series of radially disposed sockets therein communicating with the periphery thereof for selectively receiving a plurality of blades, a centrally disposed handle mounted on the holder, a plurality of blades, integral extensions on the outer upper portions of the blades, and bars fixed on the extensions and having inner end portions extending inwardly beyond the extensions in spaced parallelism with the upper edge portions of the blades for slidable endwise insertion in the sockets for removably mounting the blades on the holder.

3. A pie cutter comprising a holder including a comparatively large upper disk and a lower disk, said disks being rigidly secured together and having opposed, radially extending channels in their opposed sides defining, in conjunction with each other, a series of radially disposed sockets communicating with the periphery of the holder for selectively receiving a plurality of blades, a handle fixed centrally on the holder, a plurality of blades, integral extensions on the upper outer portions of the blades, and bars fixed on the extensions and extending inwardly therefrom for slidable endwise insertion in the sockets for removably mounting the blades on the holder.

JOSEPH B. DEUTSCH.